United States Patent
McDonnell et al.

(10) Patent No.: US 6,771,972 B2
(45) Date of Patent: Aug. 3, 2004

(54) SYSTEM AND METHOD FOR A DISTRIBUTED SEARCH FOR A LOST ASSET

(75) Inventors: James Thomas Edward McDonnell, Bristol (GB); John Deryk Waters, Bath (GB); Simon E. Crouch, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 370 days.

(21) Appl. No.: 09/821,302

(22) Filed: Mar. 29, 2001

(65) Prior Publication Data

US 2002/0019238 A1 Feb. 14, 2002

(30) Foreign Application Priority Data

Apr. 1, 2000 (GB) .............................................. 0007942

(51) Int. Cl.[7] .............................. H04Q 7/20; C12Q 1/64; G06F 7/00
(52) U.S. Cl. .............................. 455/456.1; 435/9; 701/1
(58) Field of Search .............................. 455/456, 422, 455/456.1, 422.1; 435/6, 9, 73, 287.2; 701/1, 36

(56) References Cited

U.S. PATENT DOCUMENTS

| | | |
|---|---|---|
| 4,918,425 A | 4/1990 | Greenberg et al. |
| 5,218,344 A | 6/1993 | Ricketts |
| 5,396,227 A | 3/1995 | Carroll et al. |
| 5,712,679 A | 1/1998 | Coles .......................... 348/158 |
| 5,767,788 A | 6/1998 | Ness |
| 5,774,876 A | 6/1998 | Woolley et al. |
| 5,835,017 A | 11/1998 | Ohkura et al. |
| 6,011,510 A | 1/2000 | Yee et al. |
| 2002/0019238 A1 * | 2/2002 | McDonnell et al. ......... 455/456 |
| 2003/0013146 A1 * | 1/2003 | Werb .............................. 435/9 |
| 2003/0093187 A1 * | 5/2003 | Walker .......................... 701/1 |

FOREIGN PATENT DOCUMENTS

| | | |
|---|---|---|
| EP | 0 766 096 | 2/1997 |
| FR | 27687249 A1 | 3/1999 |
| WO | WO 99/04582 | 1/1999 |
| WO | WO 99/55114 | 10/1999 |

OTHER PUBLICATIONS

Search Report dated Jul. 16, 2001, in corresponding to EP Application No. 01302191.
"Geographic Addressing, Routing, and Resource Discovery With The Global Positioning System" by Imielinski et al., Oct. 19, 1996, 9 pages.
"ArchiCAD 6.0: Architectural Software that works the way you do", Graphisoft Products, p. 1, visited Jul. 24, 2000.
"ArchiCAD 6.5", Graphisoft Products, pp. 1–2, visited Jul. 24, 2000.

* cited by examiner

Primary Examiner—William Cumming

(57) ABSTRACT

A method for searching for a lost asset equipped with a short-range wireless transceiver includes a finder service sending out a search request including a lost-asset identifier, this request being sent over a mobile radio infrastructure to a plurality of mobile devices. These devices transmit on the request in their immediate vicinity using short-range wireless transceivers. Upon a mobile device receiving back a response from the lost asset, it returns a found message over the mobile radio infrastructure to the finder service. This message includes location data concerning the whereabouts of the lost asset or the message enables such data to be obtained by the finder service.

18 Claims, 3 Drawing Sheets

SYSTEM AND METHOD FOR A DISTRIBUTED SEARCH FOR A LOST ASSET

FIELD OF THE INVENTION

The present invention relates to a distributed search method for finding lost assets.

BACKGROUND OF THE INVENTION

Communication infrastructures suitable for mobile users (in particular, though not exclusively, Public Land Mobile Networks, PLMN, in the form of cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

Data-capable bearer services can be provided, for example, by a Short Message Service (SMS), by using a voice traffic circuit for data, or by using specialised data facilities such as provided by GPRS for GSM PLMNs (GPRS—General Packet Radio Service—enables IP (or X.25) packet data to be sent through the PLMN and full details of GPRS can be found in the ETSI, European Telecommunications Standards Institute, GSM 03.60 specification).

A number of technologies also exist for the short range wireless communication of information to and between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

The increasingly widespread deployment of the foregoing technologies in mobile devices has led to an increased interest in ways of determining the location of mobile devices, primarily with a view either to providing user-location information to emergency services or to enabling the provision of location-aware information services. A number of methods exist for determining the location of a mobile user as represented by an associated mobile equipment. Some of these methods, such as the use of a GPS (global positioning system) system described below relation to FIG. 1, result in the user knowing their location thereby enabling them to transmit it to a location-aware service they are interested in receiving; other of the methods, such as the use of a PLMN location server described below in relation to FIG. 2, result in the user's location becoming known to a network entity from where it can be supplied directly to a location-aware service (generally only with the consent of the user concerned).

More particularly, on the left-hand side of FIG. 1, a mobile entity 11A is provided with a standard GPS module and is capable of determining the location of entity 11A by picking up signals from satellites 12. The entity 11A can then supply this location when requesting, in request 61, a location-aware service from service system 40. The right-hand side of FIG. 1 depicts, in relation to mobile entity 11B, two ways in which assistance can be provided to the entity in deriving location from GPS satellites. Firstly, a PLMN 10 can be provided with fixed GPS receivers 13 that each continuously keep track of the satellites 12 visible from the receiver and pass information in messages 63 to local mobile entities 11B as to where to look for these satellites and estimated signal arrival times; this enables the mobile entities 11B to substantially reduce acquisition time for the satellites and increase accuracy of measurement. Secondly, as an alternative enhancement, the processing load on the mobile entity 11B can be reduced and encoded jitter removed using the services of network entity 14 (in or accessible through PLMN 10). Once the mobile unit 11B has determined its location, it can pass this information in request 65 when invoking a location-aware service provided by service system 40.

FIG. 2 depicts two general approaches to location determination from signals present in a cellular radio infrastructure. First, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between the BSC 14 and the mobile entity). Beyond current basic cell ID, it is possible to get a more accurate fix by measuring timing and/or directional parameters between the mobile entity and multiple BTSs 15, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

The left-hand half of FIG. 2 depicts the case of location determination being done in the mobile entity 11C by, for example, making Observed Time Difference (OTD) measurements with respect to signals from BTSs (Base Transceiver Stations) 15 and calculating location using a knowledge of BTS locations. The location data is subsequently appended to a service request 66 sent to service system 40 in respect of a location aware service. The calculation load on mobile entity 110 could be reduced and the need for the mobile to know BTS locations avoided, by having a network entity do some of the work. The right-hand half of FIG. 2 depicts the case of location determination being done in the network, for example, by making Timing Advance measurements for three BTSs 15 and using these measurements to derive location (this derivation typically being done in a unit associated with BSC, Base Station Controller, 16). The resultant location data is passed to a location server 17 from where it can be made available to authorised services. When the mobile entity 11D of FIG. 5 wishes to invoke a location-aware service available on service system 40, it sends a request 69 including an authorisation token and its ID (possible embedded in the token) to the service system 40; the service system then uses the authorisation token to obtain the current location of the mobile entity 11D from the location server 17. The service system 40 can be pre-authorised to access the location server 17.

The possibility of using the locatability of mobile devices to provide security systems has been proposed. Thus U.S. Pat. No. 5,712,679 describes a vehicle security system in which a vehicle is provided with a locatable portable electronic camera which, when triggered by unauthorized activity, takes a picture and stores it with location data; at the same time it sends the picture and location data back to a remote receiver where the location data is displayed on a map display and the picture on a TV display.

It has also been proposed to geographically route messages to mobile devices. The paper "Geographic Addressing, Routing and Resource Discovery with GPS" (Tomasz Imielinski and Julio C. Navas; Computer Science Department, Rutgers, The State University Piscataway, N.J.) describes various geographic routing applications including geographic email, geographic broadcasting, and geographically directed multicasting, for example, to all police cars in a specified area.

It is an object of the present invention to provide a distributed search method for finding lost assets that utilizes certain capabilities of mobile devices equipped both with mobile radio communication means and short-range wireless transceivers.

SUMMARY OF THE INVENTION

According to one aspect of the present invention, there is provided a method of searching for a lost asset provided with a short-range wireless transceiver operative to respond to receipt of an enquiry transmission including an identifier of the asset, the method comprising the steps of:

(a) sending out from a finder service a search request including the identifier of a lost asset, this request being sent over a mobile radio infrastructure to a plurality of mobile entities each equipped both with a radio transceiver for communicating with the infrastructure and with a short-range wireless transceiver;

(b) locally transmitting from mobile entities that have received the search request, a search enquiry incorporating the lost-asset identifier, this enquiry being transmitted using the short-range wireless transceivers of the mobile entities;

(c) upon a mobile entity receiving back a response from the lost asset, returning a found message over the mobile radio infrastructure to the finder service, this response either including location data concerning the whereabouts of the lost asset or enabling such data to be obtained by the finder service.

According to another aspect of the present invention, there is provided a mobile device comprising:

a radio subsystem for sending and receiving messages using a mobile radio infrastructure;
a short-range wireless transceiver; and
a control subsystem operative upon receipt, by the cellular radio subsystem, of a search-request message including the identifier of a lost asset, to cause the short-range wireless transceiver to transmit a local search enquiry incorporating the lost-asset identifier, the control subsystem being further operative, upon the short-range wireless transceiver receiving back a response from the lost asset, to cause the cellular radio subsystem to the return a found message over the mobile radio infrastructure, this found message either including location data concerning the whereabouts of the lost asset or enabling such data to be obtained by the finder service.

BRIEF DESCRIPTION OF THE DRAWINGS

A method, embodying the present invention, for effecting a distributed search for a lost asset, will now be described, by way of non-limiting example, with reference to the accompanying diagrammatic drawings, in which.

BEST MODE OF CARRYING OUT THE INVENTION

Figure 3:
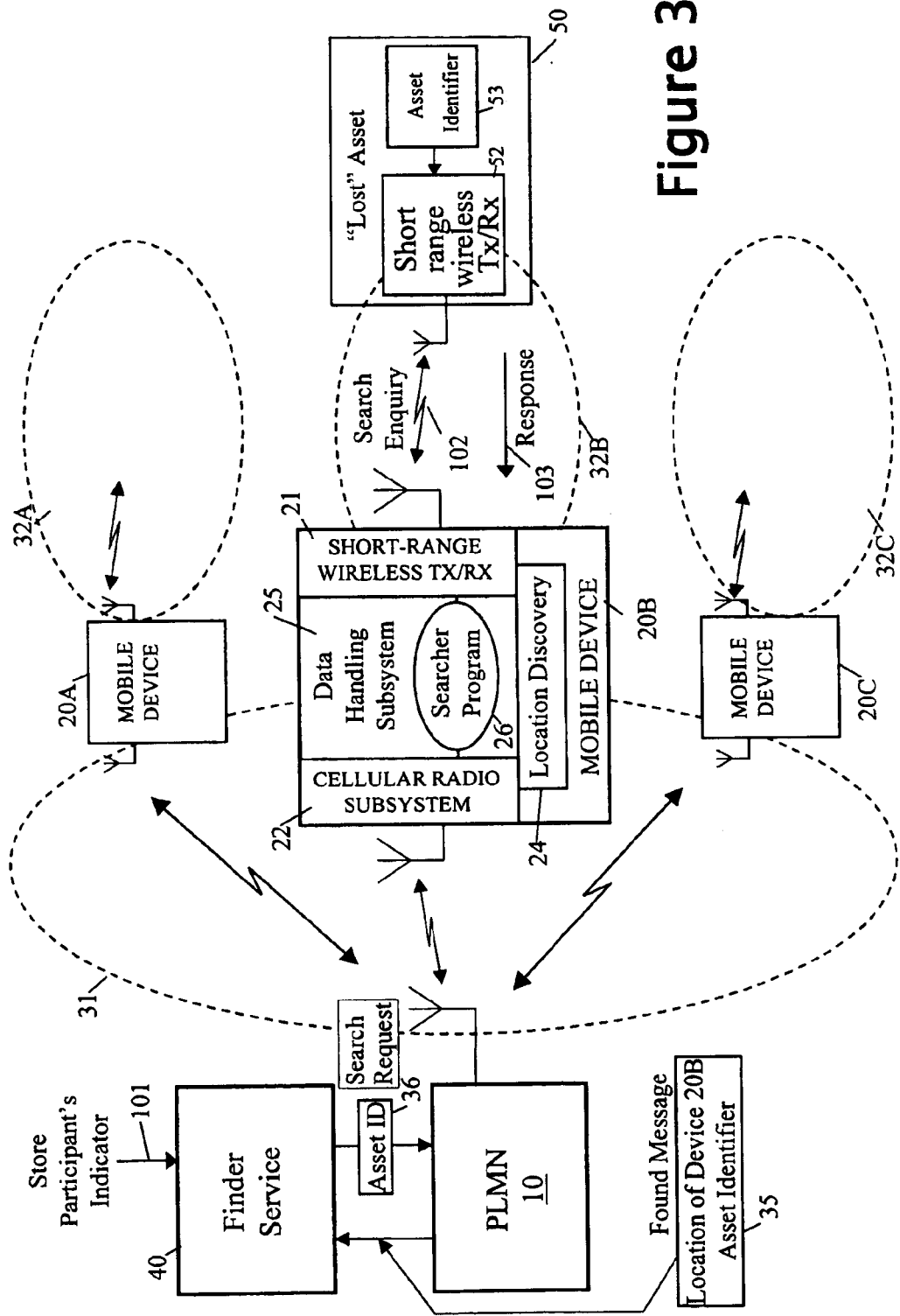
FIG. 3 is a diagram showing the involvement of three mobile devices in the distributed search method embodying the present invention.

FIG. 3 shows a lost asset 50 associated with which is a short-range wireless transceiver 52 (for example, using a radio-based technology such as BLUETOOTH™ technology, or an infrared technology) and a memory 53 storing an identifier associated with the asset; this identifier can simply be an address of the transceiver 52 or an identifier specific to the asset such as a vehicle chassis number where the asset is a vehicle. The short-range transceiver 52 which is normally in a quiescent, listening, state, is operative to respond automatically upon receiving a search enquiry bearing the identifier of the lost asset. The lost asset can, for example, be a physical item (a vehicle, a handbag, a bicycle, etc) or a child or animal.

Also shown in FIG. 3 are three mobile devices 20A, 20B and 20C of the same general form. More particularly, each device 20 comprises the following four main subsystems:

a short-range wireless transceiver subsystem 21A, 21B, 21C compatible with the transceiver 52 associated with the lost asset 50; the coverage of the transceiver subsystem is indicated by dashed ellipse 32A, 32B, 32C in FIG. 3.

a cellular radio subsystem 22 for sending and receiving data over a data-capable bearer service of a PLMN 10. Whilst the cellular radio subsystem will generally be provided in conjunction with voice phone functionality, this is not essential for the purposes of the present invention. In the current example, the three devices 20 are assumed to be within the same cell of PLMN 10, this cell being delimited in FIG. 3 by dashed ellipse 31.

a data-handling system 25 that interfaces with both the short-range wireless transceiver subsystem 21 and the cellular radio subsystem 22 via appropriate interfaces. The data-handling subsystem 25, when so instructed by the device user through a device user interface (not shown), is enabled to run a searcher program 26 in response to the receipt of a search request received from a finder service system 40 via a data-capable bearer service of PLMN 10 and the cellular radio subsystem 22.

a location discovery subsystem 24 for discovering the location of the mobile device; the location discovery subsystem can effect location discovery in any suitable manner, for example, by enquiry to a location server of the PLMN 10, by measurements carried out itself off the PLMN 10, or by an in-built GPS system.

The subsystems 21, 22, 24 and 25 will generally be integrated into a single device; however, it would be possible to provide the subsystems in two or more separate physical elements appropriately linked together to operate as a single device.

The finder service system can be directly connected to the PLMN 10 or connected via an intermediate network, such as an intermediate telephone network or the public Internet, as will be well understood by persons skilled in the art.

Figure 1:
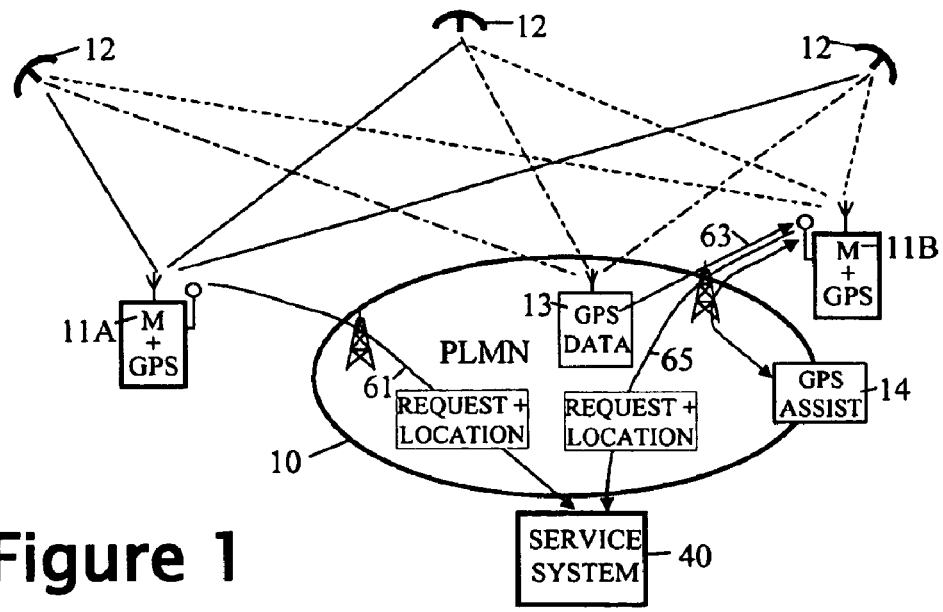
FIG. 1 is a diagram illustrating one known approach to determining the location of a mobile entity, this approach involving the use of GPS satellites.
Figure 2:
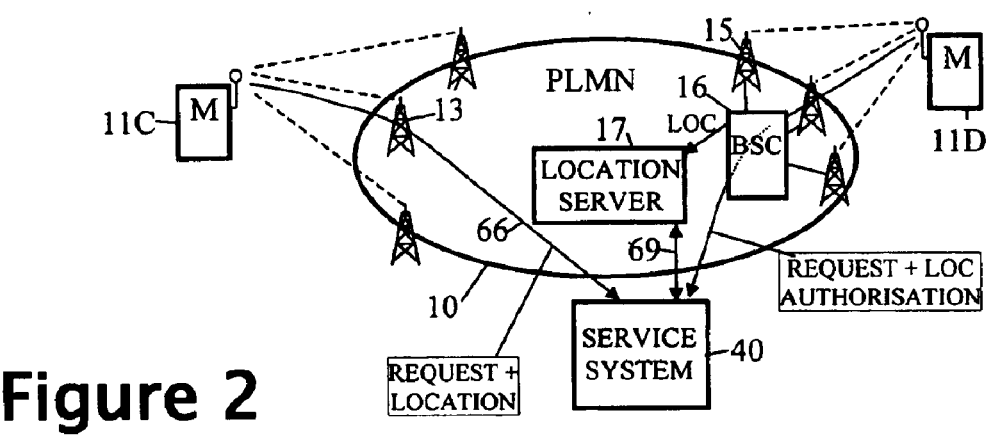
FIG. 2 is a diagram illustrating another approach to determining the location of a mobile entity, this approach being based on the use of signals present in a cellular mobile radio communications system.
Figure 4:
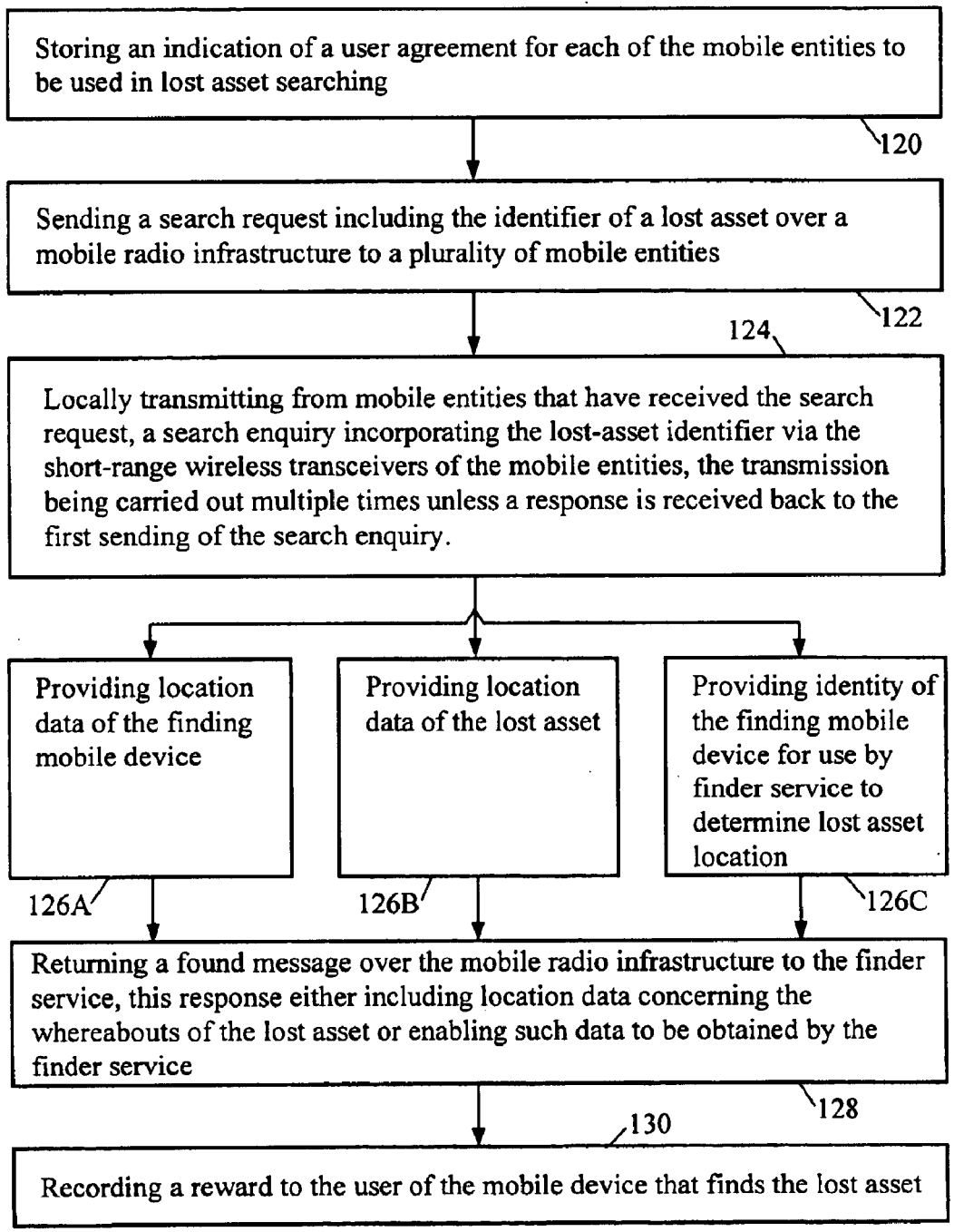
FIG. 4 is a flow diagram of the method embodying the resent invention.

Referring to FIGS. 3 and 4, the method of the present invention includes step 120 that stores an indication of a user agreement for the mobile devices 20A, 20B and 20C to be used in the search for lost asset 50. The indication of the user agreement, for example, is based on user profile data held by the finder service or the PLMN 10, have a suitable short-range transceiver subsystem and have agreed to participate in the finder service. Upon a person discovering the loss of asset 50, the finder service system 40 is contacted and a search request 36 is sent out including the identifier of the lost asset as denoted by arrow 101 in FIG. 3 and step 122 in FIG. 4. This search request is sent via a data-capable bearer service of PLMN 10 (such as an SMS-based service) to all mobile devices 20 that according to user profile data held by the finder service or the PLMN 10, have a suitable short-range transceiver subsystem and have agreed to participate in the finder service. The request can also be restricted to a general location where the asset is believed, with high probability, to be. In GSM networks, the simplest geographical bounding zone would be a "location area" since the current location area of a mobile device that is switched on is always known; however, a location area is large and a more limited geographic boundary may be desirable and can be achieved, at a cost, by obtaining the current location of the suitable mobile devices (for example, by enquiry to a location server such as the location server 17 of FIG. 2) and then only sending to devices located in the area of interest.

Upon a mobile device, such as device 20B, receiving the search request, the searcher program 26 is run. This program generates an enquiry message 102 including the asset identifier contained in the search request, and sends the enquiry message out over the short-range wireless transceiver subsystem 21 as indicated by step 124 in FIG. 4. The sending of this message is repeated at intervals until the first to occur of the asset being found, a terminate message being received (see below), and a preset search time limit being reached.

If the short-range transceiver 52 associated with the lost asset 50 is within range of a transmitting device 20, it responds, sending back its identifier as indicated by arrow 103 in FIG. 3. In the present example, the lost asset is in the coverage zone of the short-range transceiver of mobile device 208 but not of the other two devices 20A, 20C. Accordingly, only device 20B receives a response from the lost asset 50. Device 20B next obtains its own location (and thus the location of the lost asset to a close approximation) by using the location discovery subsystem 24 as indicated by step 126A in FIG. 4. A found message 35 is then sent back to the finder service system 40 via the cellular radio subsystem 22 and PLMN 10 as indicated by step 128 in FIG. 4. This found message contains the identifier of the lost asset and its location (the location of the device 20B as provided by subsystem 24).

Upon the finder service receiving the found message, the search process is terminated by sending a terminate search message via PLMN to all participating devices 20, and the person requesting the search is informed of the location of the lost asset. The user of the finding mobile device can also be credited a reward (which could, for example, be a discount on usage of the PLMN 10) as indicated by step 130 in FIG. 4. Such a reward incentive is useful in encouraging users to agree to their devices participating in the search process.

Whilst the above search method has been described as taking place without human intervention (except at the finder service system), where the lost asset is a child, animal or high-valued asset, it will generally be desirable to have the user of the finding mobile device take appropriate action to protect the asset. To this end, the user can be called by the finder service (in cases where the mobile device includes telephone functionality) and given appropriate instructions. Contacting the user of the finding device is also useful in obtaining precise details of location of the lost asset and, indeed, location could be derived solely by this method without the need for the location discovery subsystem 24 of devices 20.

The location information could alternatively be provided by means associated with the lost asset itself, such as a GPS system as indicated by step 126B in FIG. 4, the location data being sent by transceiver 52 to the finding mobile device for incorporation in the found message 35. Yet another way of providing location information is for the finder service system 40 to request the location of the finding device from a location server of PLMN 10, the finding device having included its identity in the found message (the device will have also given its authorization for its location to be provided to service system 40, this authorization either being given in the found message or previously) as indicated by step 126C in FIG. 4.

As will be appreciated by persons skilled in the art, many variants are possible to the above-described embodiment. For example, where the asset in question is a person, it may be appropriate that the associated transceiver can be deactivated by that person for privacy reasons.

What is claimed is:

1. A method of searching for an asset lost by one party using mobile entities of other parties, the asset being provided with a short-range wireless transceiver operative to respond to receipt of an enquiry transmission including an identifier of the asset, the method comprising:

storing an indication of user agreement for their mobile entity to be used in lost-asset searching, each such mobile entity being equipped both with a radio transceiver for communicating with a mobile radio infrastructure, and with a short-range wireless transceiver;

sending out from a finder service a search request including the identifier of a lost asset, this request being sent over the mobile radio infrastructure to at least some of the mobile entities for which a said indication of user agreement for lost asset searching has been stored;

locally transmitting from mobile entities that have received the search request, a search enquiry incorporating the lost-asset identifier, this enquiry being transmitted using the short-range wireless transceivers of the mobile entities;

upon a mobile entity receiving back a response from the lost asset, returning a found message over the mobile radio infrastructure to the finder service, this message either including location data concerning the whereabouts of the lost asset or enabling such data to be obtained by the finder service.

2. A method according to claim 1, wherein locally transmitting from mobile entities that have received the search request, a search enquiry incorporating the lost-asset identifier, this enquiry being transmitted using the short-range wireless transceivers of the mobile entities, is carried out multiple times unless a response is received back to the first sending of the search enquiry.

3. A method according to claim 1, wherein the location data is included in the found message by the mobile entity receiving the response back from the lost asset.

4. A method according to claim 3, wherein the location data is generated by the mobile entity as its own location using a (global positioning system) GPS system of the mobile entity or by calculation from measurements off the mobile radio infrastructure.

5. A method according to claim 3, wherein the location data is provided by the lost asset itself using a GPS system associated with the asset.

6. A method according to claim 3, wherein the location data is provided to the mobile entity in response to a request made by the latter to a location server associated with the mobile radio infrastructure, the location server deriving the location of the entity by calculation from measurements off the mobile radio infrastructure.

7. A method according to claim 1, wherein the finder service on receiving the found message obtains the location data by requesting the location of the mobile entity either from the latter or from a location server that is associated with the mobile radio infrastructure and is operative to derive the location of the entity by calculation from measurements off the mobile radio infrastructure.

8. A method according to claim 1, wherein them mobile radio infrastructure is a cellular radio infrastructure, the search request only being sent to mobile entities within selected cells of the cellular radio infrastructure.

9. A method according to claim 1, wherein the search request is sent only to mobile entities which according to user profile data held by the mobile radio infrastructure or the finder service, have short range wireless transceivers.

10. A method according to claim 1, wherein the search request is sent only to mobile entities which according to user profile data held by the radio infrastructure or the finder service have short range wireless transceivers compatible with that of the lost asset.

11. A method according to claim 1, wherein a reward is recorded to the user of the mobile entity that finds the lost asset.

12. A service system for searching for an asset lost by one party by using mobile entities of other parties, the asset being provided with a short-range wireless transceiver operative to respond to receipt of an enquiry transmission including an identifier of the asset; the system comprising:
   a finder-service arrangement for sending out search requests over a mobile radio infrastructure and for receiving back found messages over that infrastructure; and
   a plurality of mobile entities each equipped both with a radio transceiver for communicating with the mobile radio infrastructure and with a short-range wireless transceiver, a said mobile entity being operative upon receiving a said search request over the mobile radio infrastructure to locally transmit a search enquiry incorporating the lost-asset identifier using its short-range wireless transceiver, and being further operative upon receiving back a response from the lost asset, to return a said found message to the finder service arrangement via the mobile radio infrastructure;
the finder-service arrangement comprising:
   storage means for storing data indicating mobile entities for which user agreement has been given for their use in lost-asset searching;
   search-request sending means for ascertaining from said data, appropriate mobile entities for participating in searching for a particular lost asset and for sending out to these entities a search request including the identifier of the lost asset; and
   receiving means for receiving back a said found message from a said mobile entity, this message either including location data concerning the whereabouts of the lost asset or enabling such data to be obtained.

13. A system according to claim 12, wherein the location data is included in the found message by the mobile entity receiving the response back from the lost asset.

14. A system according to claim 12, wherein the finder-service arrangement further comprises means responsive to the receipt of a found message by the receiving means to obtain said the location data by requesting the location of the mobile entity either from the latter or from a location server that is associated with the mobile radio infrastructure and is operative to derive the location of the entity by calculation from measurements off the mobile radio infrastructure.

15. A system according to claim 12, wherein the search-request sending means includes means for restricting sending of the search request only to mobile entities located in an area of interest.

16. A system according to claim 12, further comprising user-profile-data storage means for holding type data regarding the type of short-range transceiver possessed by each mobile entity, the search-request sending means including means for restricting sending of the search request only to mobile entities which according to said type data have short range wireless transceivers compatible with that of the lost asset.

17. A system according to claim 12, wherein the finder-service arrangement comprises means for recording a reward to the user of the mobile entity that finds the lost asset.

18. A service system for searching for an asset lost by one party by using mobile entities of other parties, the asset being provided with a short-range wireless transceiver operative to respond to receipt of an enquiry transmission including an identifier of the asset; the system comprising:
   a finder-service arrangement for sending out search requests over a mobile radio infrastructure and for receiving back found messages over that infrastructure; and
   a plurality of mobile entities each equipped both with a radio transceiver for communicating with the mobile radio infrastructure and with a short-range wireless transceiver, a said mobile entity being operative upon receiving a said search request over the mobile radio infrastructure to locally transmit a search enquiry incorporating the lost-asset identifier using its short-range wireless transceiver, and being further operative upon receiving back a response from the lost asset, to return a said found message to the finder service arrangement via the mobile radio infrastructure;
the finder-service arrangement comprising:
   a data store storing data indicating mobile entities for which user agreement has been given for their use in lost-asset searching;
   search-request sending subsystem operative to ascertain from said data, appropriate mobile entities for participating in searching for a particular lost asset and to send out to these entities a search request including the identifier of the lost asset; and
   a receiving subsystem operative to receive back a said found message from a said mobile entity, this message either including location data concerning the whereabouts of the lost asset or enabling such data to be obtained.

* * * * *